United States Patent [19]
Brown et al.

[11] Patent Number: 5,727,659
[45] Date of Patent: Mar. 17, 1998

[54] DIE CAST DISC BRAKE WITH A VIBRATION DAMPERING FLAT SPRING

[75] Inventors: Donald D. Brown, Thiensville; Curt H. Blaszczyk, Sturtevant; James A. Buckley, Whitefish Bay; Eric R. Buckhouse, Oak Creek, all of Wis.

[73] Assignee: Hayes Industrial Brake, Inc., Mequon, Wis.

[21] Appl. No.: 725,616

[22] Filed: Oct. 3, 1996

[51] Int. Cl.⁶ ........................... F16D 65/38
[52] U.S. Cl. ............ 188/73.36; 188/72.7; 188/72.9; 188/73.45
[58] Field of Search ............. 188/72.7, 72.3, 188/72.9, 73.45, 73.44, 73.35, 73.36, 73.37, 73.31, 73.38

[56] References Cited

U.S. PATENT DOCUMENTS

| | | | |
|---|---|---|---|
| 4,940,120 | 7/1990 | Schmidt et al. | 188/73.36 |
| 5,038,895 | 8/1991 | Evans | 188/72.9 X |
| 5,529,150 | 6/1996 | Buckley et al. | 188/72.9 |

FOREIGN PATENT DOCUMENTS

| | | | |
|---|---|---|---|
| 214373 | 3/1987 | European Pat. Off. | 188/72.9 |
| 1366446 | 9/1974 | United Kingdom | 188/73.36 |
| 2017236 | 10/1979 | United Kingdom | 188/73.36 |
| 2056601 | 3/1981 | United Kingdom | 188/73.36 |

*Primary Examiner*—Peter M. Poon
*Attorney, Agent, or Firm*—Foley & Lardner

[57] ABSTRACT

A caliper brake assembly adapted to be mounted on a frame or housing in a position to engage each side of a brake disc, the assembly including a pair of bushings mounted on the frame, a one piece caliper housing mounted on the bushings, a brake pad assembly mounted on the bushings on each side of the brake disc, a ball ramp rotor assembly mounted on one side of the caliper housing for moving the brake pads into engagement with the brake disc, a flat spring mounted on the brake pad assemblies to prevent vibration of the brake pad assemblies.

6 Claims, 3 Drawing Sheets

DIE CAST DISC BRAKE WITH A VIBRATION DAMPERING FLAT SPRING

FIELD OF THE INVENTION

The present invention relates to floating type caliper brakes and more particularly to a die cast housing assembly for a lever actuated disc or service brake caliper assembly.

BACKGROUND OF THE INVENTION

A disc brake for heavy duty construction and off-road equipment is shown and described in U.S. patent application for "Parking Brake," Ser. No. 08/441,961, filed on May 16, 1995. The parking brake described therein requires an elaborate mounting structure for the caliper which is expensive and requires an elaborate seal structure.

SUMMARY OF THE PRESENT INVENTION

The present invention relates to a lever actuated disc or service brake assembly having a one piece die cast caliper housing for supporting a ball type actuator assembly for moving the brake pad assemblies into engagement with the brake disc. The disc or service brake presented here includes a one piece die cast housing which is supported by a pair of bushings mounted on a frame and a pair of brake pad assemblies supported on the same bushings. A spring is mounted in the housing to keep the brake pads from rattling on the bushings.

The brake design provides for a one piece die cast housing and a pair of brake pads supported on a pair of bushings independently of each other. A spring plate is suspended between the top of the brake pads and an abutment in the housing to prevent rattling of the brake pads on the bushings. A second spring plate is mounted on one of the bushings to bias the brake pads into engagement with the other bushing and thereby maintain pressure on the other bushing.

Other principal features and advantages of the invention will become apparent to those skilled in the art upon review of the following drawings, the detailed description and the appended claims.

Figure 1:
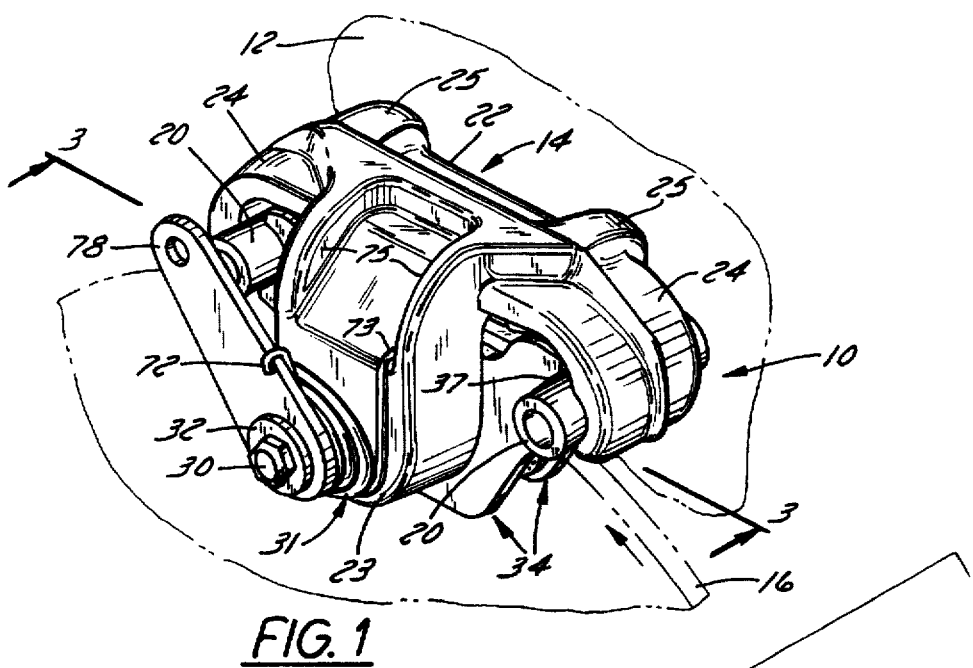
FIG. 1 is a perspective view of the brake assembly shown mounted on the bushing.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
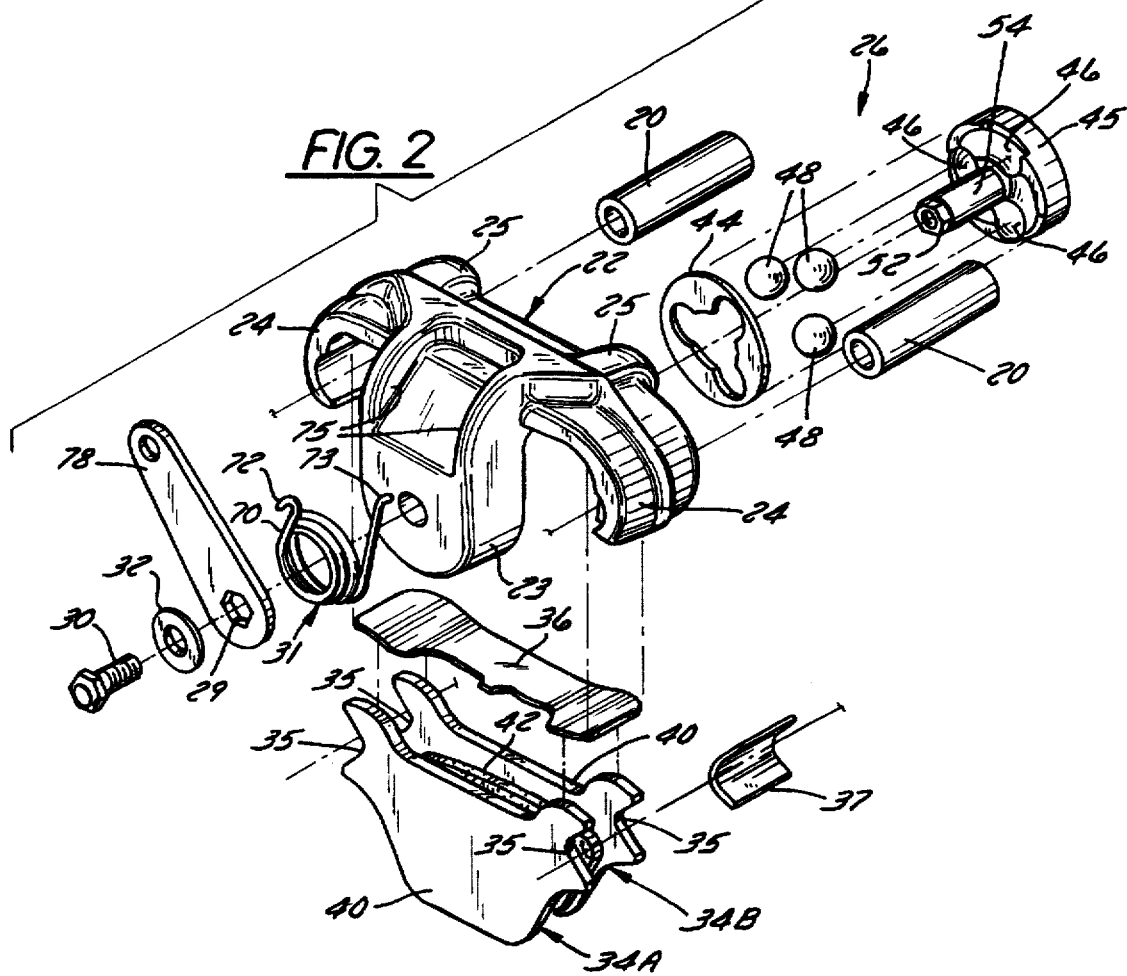
FIG. 2 is an exploded view of the brake assembly.

The caliper disc brake assembly 10 according to the present invention, as shown in FIGS. 1 and 2 is mounted on a frame or housing 12. The disc brake assembly generally includes a one piece die cast caliper 14 which is positioned to bridge a rotary brake disc 16 as shown in phantom in FIG. 1. The caliper 14 is supported by a pair of bushings 20 mounted on the frame 12 by means of a pair of bolts (not shown). The bushings 20 may be coated with a dry lubricant such as PTFE or graphite which lubricates the bushings to provide free movement of the caliper as well as protecting the bushings from corrosion. The caliper assembly 14 is free to move longitudingly with respect to the bushings 20.

Referring to FIG. 2 an exploded view of the caliper assembly 10 is shown which generally includes a one piece die cast caliper housing 22 having a pair of arcuate wings 24 aligned with the bushings 20, a ball ramp section 23 depending on one side of the brake disc 16 and a pair of supports 25 depending from the other side of the brake disc 16 to retain the brake pads on the bushings. A ball ramp assembly 26 is aligned with an opening 28 in the caliper housing 22. A lever arm 78 having a hexagonal or splined opening 29 is aligned with a hexagonal or splined nut 52 mounted on the end of the ball ramp assembly 26 and secured thereto by a bolt 30 and a washer 32. A pair of brake pad assemblies 34 are aligned with the bushings 20 in the caliper housing 22 and stabilized thereon by means of a flat spring 36 and a curved spring 37 as more particularly described herein.

Figure 3:
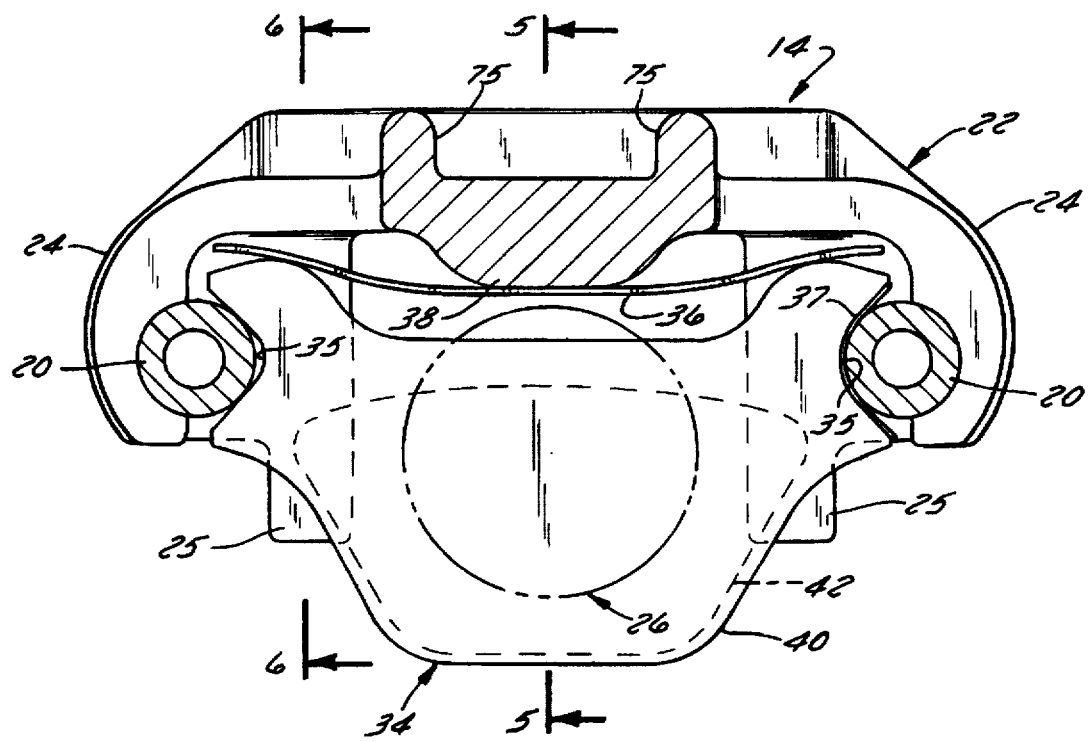
FIG. 3 is a view taken on line 3—3 of FIG. 1 showing the mounting arrangement for the die cast housing and the brake pad.
Figure 4:
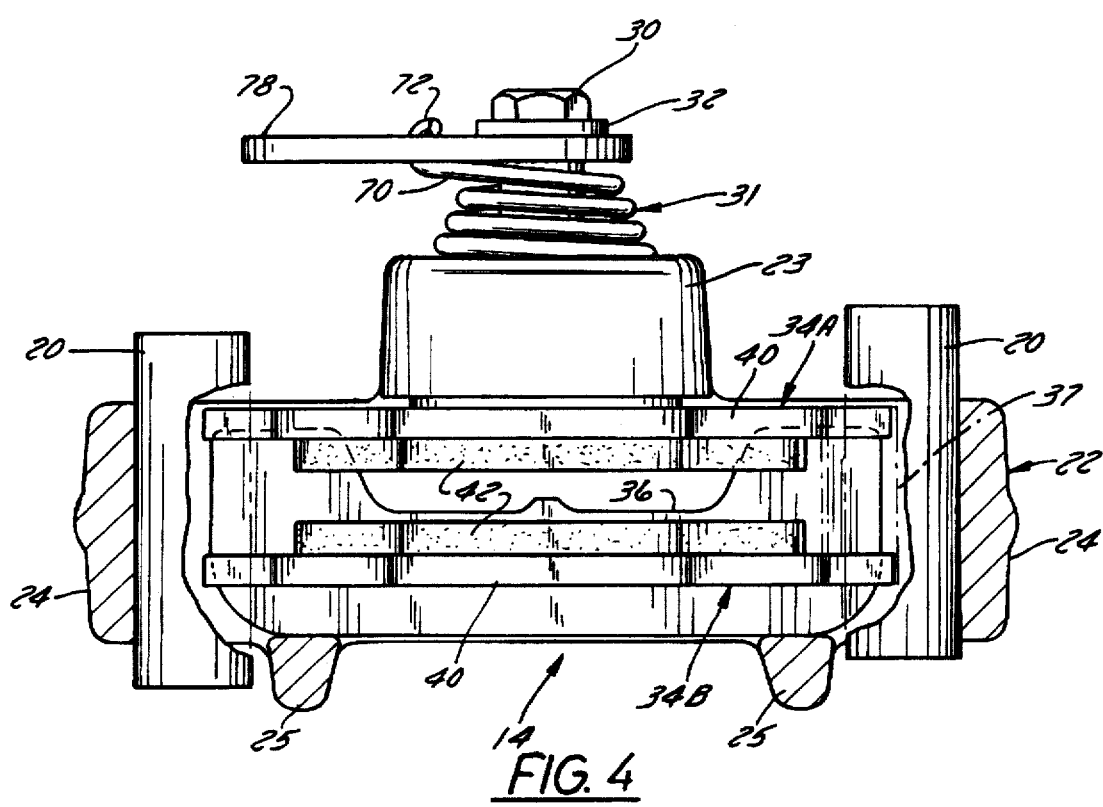
FIG. 4 is a top view, partly broken away to show the spring assembly.

Referring to FIG. 3, which is a cross section taken on line 3—3 of FIG. 1, the arcuate wings 24 are shown centered on the bushings 20 with the brake pad assemblies 34 supported on the bushings 20. The spring plate 36 is aligned with the top of the brake pads 34 and forced downward by a hump 38 on the housing to bias the brake pads into engagement with bushings 20 and thereby prevent vibration of the brake pad assemblies. The curved spring 37 is mounted on the bushing 20 on the side opposite to the direction of rotation of the disc 16 to bias the brake pad assemblies into engagement with the bushing 20 on the opposite side of the housing to minimize rattle and torque induced pad impact.

Each brake pad assembly 34 includes a back plate 40 and a brake pad 42 mounted on the inside of each of the plates 40. Each back plate includes a V-shaped slot 35 on each end which is aligned with the bushings 20 as shown in FIG. 3. On assembly the flat spring 36 is depressed by the hump 38 into engagement with the top of the bushings 20 thereby stabilizing the plates on the bushings 20 and preventing vibration causing the caliper assembly 14 or the pads 34 from impacting the bushings 20.

The ball ramp assembly 26 as shown in FIG. 2 includes three ball ramps 46 formed in a ball ramp plate 45 and three corresponding ramps 43 formed in the caliper housing each having a ball 48 aligned with each of the ball ramps 43 and 46. A ball retainer 44 maintains equal spacing between the balls 48 in the ramps 43 and 46. A hex or spine nut 52 is provided on the end of the column 54. The lever arm 78 is provided with a hex or spline opening 29 which is aligned with the hexagonal or spline nut 52 on the column 54 and retained thereon by bolt 30 and washer 32. A coil spring 31 is positioned between the lever arm 78 and the caliper housing 22. In this regard, one end 70 of the coil spring is provided with a hook 72 which engages the lever arm 78 and the other end 73 of the coil spring is biased into engagement with the ridge 75. With this arrangement the lever arm 78 rotates the ball ramp plate 45 and moves axially to return the brake to the off position.

Figure 5:
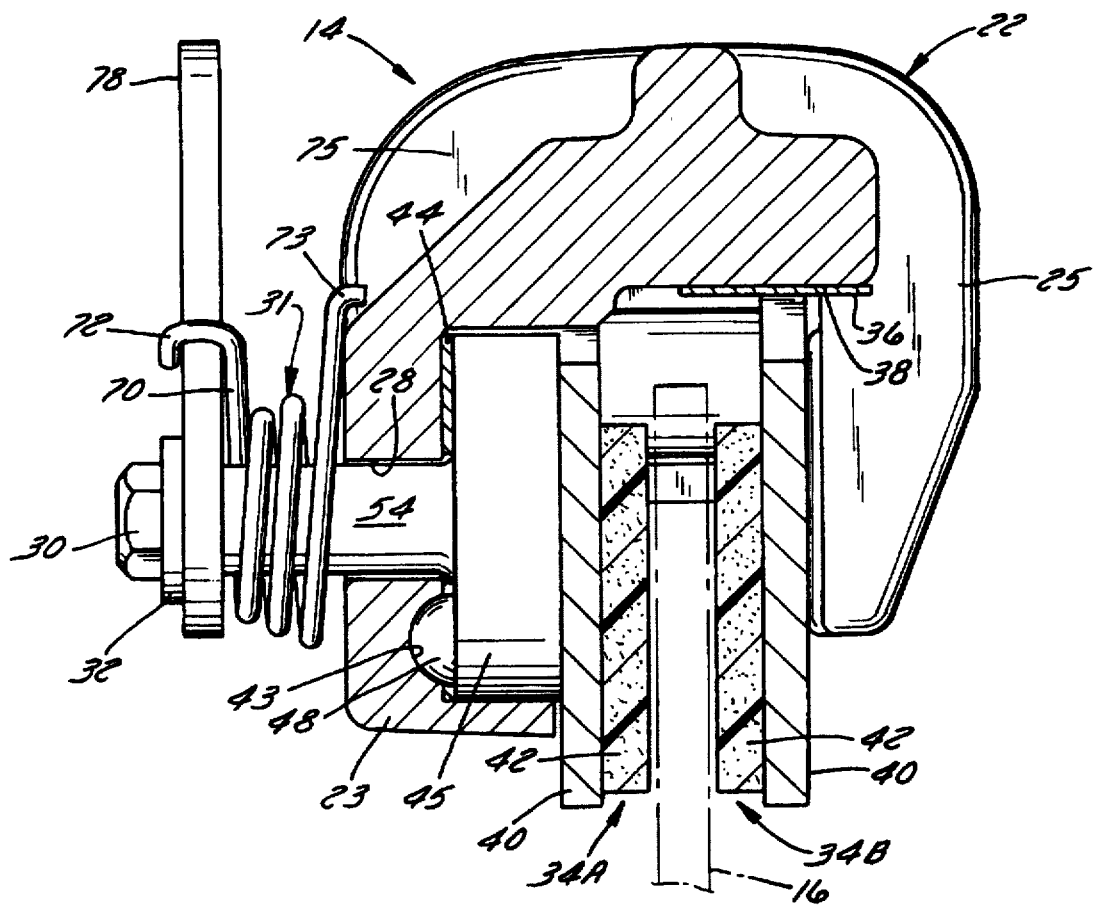
FIG. 5 is a view taken on line 5—5 of FIG. 4.
Figure 6:
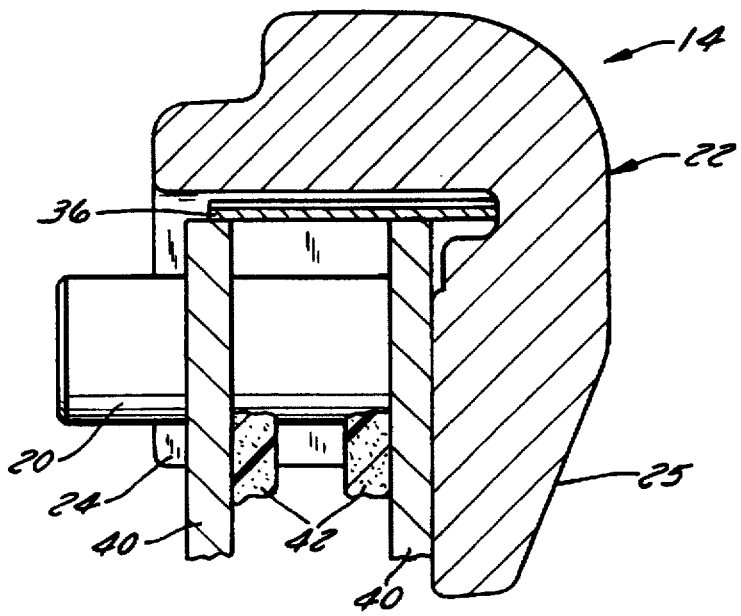
FIG. 6 is a view taken on line 6—6 of FIG. 3.

As shown in FIGS. 5 and 6 the ball ramp plate 45 is rotated by the lever arm 78 to move the brake pad assemblies 34A and 34B into engagement with the disc 16. As generally understood, as the force increases the caliper will move the brake pads into engagement with the brake disc 16 to thereby squeeze the brake pads 42 against the disc 16. On release, the brake pad assembly 34A is backed off the disc 16 by the coil spring 31 as the ball ramp plate 45 is rotated to the "off" position. At the same time the brake pad assembly 34B remains in position thus compensating for wear of the brake pads.

Thus, it should be apparent that there has been provided in accordance with the present invention a die cast disc brake that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A caliper brake assembly adapted to be mounted on a frame in a position to engage a brake disc, said assembly comprising:

a pair of bushings mounted on the frame;

a die cast caliper having an arcuate wing formed on each end for supporting the caliper on said bushings, a brake pad mounted on said bushings on each side of the disc, a rotor mounted on one side of said caliper in a position to engage one of said brake pads, a ball ramp assembly positioned between said caliper and said rotor for moving said brake pads into engagement with the brake disc, and means for biasing said brake pads into engagement with said bushings wherein said biasing means comprises a flat spring mounted on said brake pads and a hump formed on a top center of said casting intermediate said bushings for forcing said flat spring into engagement with the brake pads.

2. The brake assembly according to claim 1 including a curved spring mounted on the bushing opposite to the direction of rotation of the disc for biasing said brake pads into engagement with the other bushing.

3. A caliper brake assembly adapted to be mounted on a frame in a position to engage a brake disc, said assembly comprising:

a one piece casting having an arcuate wing on each side, a hump formed in a top center of said casting, a housing on the front of the casting and a pair of supports on the back of the casting, a bushing aligned with each wing, a pair of brake pad assemblies supported on said bushings between the casting and the supports, a flat spring aligned with and operatively associated with said hump in said casting for biasing said brake pad assemblies into engagement with said bushings, and a ball/ramp assembly mounted in said housing in a position to move one of said brake pad assemblies into engagement with the disc.

4. The brake assembly according to claim 3 including a curved spring mounted on one of the bushings for biasing the brake pad assemblies into engagement with the other bushing.

5. A caliper brake assembly adapted to be mounted on a housing in a position to engage a brake disc, said assembly comprising:

a one piece die cast caliper housing having an arcuate wing on each side, a bushing mounted on each side of said caliper housing in alignment with said wings, a brake pad mounted on said bushings on each side of the disc, a rotor assembly mounted on one side of said caliper housing, a ball/ramp assembly mounted on said caliper housing for moving one of said brake pads into engagement with the brake disc, a number of constant angle ramps formed in said rotor assembly, and an equal number of constant angle ramps cast into the caliper housing, a ball positioned in each of said ramps whereby the brake pads are moved into engagement with the disc on rotation of said rotor assembly and a flat spring mounted on assemblies of said brake pads assemblies and a hump formed under the top of said caliper having in a position to force the flat spring into engagement with the brake pads.

6. The brake assembly according to claim 5 including a curved spring mounted on one of the bushings for biasing the assemblies of the brake pads into engagement with the other bushing.

* * * * *

UNITED STATES PATENT AND TRADEMARK OFFICE
CERTIFICATE OF CORRECTION

PATENT NO.   : 5,727,659
DATED        : March 17, 1998
INVENTOR(S)  : Brown et al.

It is certified that error appears in the above-identified patent and that said Letters Patent is hereby corrected as shown below:

On the title page: Item [54] and Column 1, line 2,

Replace "DAMPERING" with --DAMPENING--.

IN THE CLAIMS:

In claim 5, column 4, line 40, delete the second occurrence of "assemblies".

In claim 5, column 4, line 41, replace "having" with --housing--.

In claim 5, column 4, line 43, after "with the", insert --assemblies of said--.

Signed and Sealed this

Twenty-sixth Day of May, 1998

Attest:

BRUCE LEHMAN

Attesting Officer

Commissioner of Patents and Trademarks